(12) United States Patent
Prisell

(10) Patent No.: US 9,789,959 B2
(45) Date of Patent: Oct. 17, 2017

(54) PROPULSION SYSTEM FOR AN AERIAL VEHICLE

(71) Applicant: Forsvarets materielverk, Stockholm (SE)

(72) Inventor: Erik Prisell, Vendelso (SE)

(73) Assignee: FORSVARETS MATERIELVERK, Stockholm (SE)

( * ) Notice: Subject to any disclaimer, the term of this patent is extended or adjusted under 35 U.S.C. 154(b) by 117 days.

(21) Appl. No.: 14/899,636

(22) PCT Filed: Jun. 25, 2014

(86) PCT No.: PCT/SE2014/000090
§ 371 (c)(1),
(2) Date: Dec. 18, 2015

(87) PCT Pub. No.: WO2014/209198
PCT Pub. Date: Dec. 31, 2014

(65) Prior Publication Data
US 2016/0152334 A1     Jun. 2, 2016

(30) Foreign Application Priority Data

Jun. 25, 2013   (SE) ...................................... 1300448

(51) Int. Cl.
*B64C 39/00*     (2006.01)
*B64C 15/02*     (2006.01)
(Continued)

(52) U.S. Cl.
CPC ............ *B64C 39/005* (2013.01); *B64C 15/02* (2013.01); *B64C 21/04* (2013.01); *B64C 21/06* (2013.01);
(Continued)

(58) Field of Classification Search
CPC ....... B64C 39/005; B64C 15/02; B64C 21/04; B64C 21/06; B64C 21/08; B64C 29/0025; B64D 27/18
See application file for complete search history.

(56) References Cited

U.S. PATENT DOCUMENTS

| 2,523,938 | A | * | 9/1950 | Berliner | ................. | B64D 27/02 |
| | | | | | | 123/41.7 |
| 3,018,982 | A | * | 1/1962 | Multhopp | .............. | B64D 27/20 |
| | | | | | | 244/15 |

(Continued)

FOREIGN PATENT DOCUMENTS

GB         920894        3/1963

*Primary Examiner* — Justin Benedik
(74) *Attorney, Agent, or Firm* — Jacobson Holman, PLLC.

(57) ABSTRACT

The invention relates to a propulsion system concept that is a propulsion system that is integrated in the hull of an aerial vehicle (1), which propulsion concept comprises at least one differential velocity fan (4), which is arranged on a shaft driven by one or more power units (2). The propulsion concept is intended to provide short takeoff and landing distances, high flight speed (high subsonic to transsonic) and to be able to provide low IR signature, low radar signature, a small cross section and low air resistance. The propulsion concept is called HPVO (High Performance Optimized Versatile propulsion). The invention is useful both for air vehicles of the type for conventional takeoff and landing, "CTOL" (Conventional Take Off and Landing), "Chair" and for vertical takeoff and landing, "V (t) OL" (Vertical (Take) Off and Landing') and the flying wing (blended-body). The concept is applicable to both large and small aircraft, manned as well as unmanned aerial vehicles.

6 Claims, 14 Drawing Sheets

(51) Int. Cl.
*B64C 21/06* (2006.01)
*B64C 21/08* (2006.01)
*B64D 27/18* (2006.01)
*B64C 21/04* (2006.01)
*B64C 29/00* (2006.01)
*B64C 39/10* (2006.01)

(52) U.S. Cl.
CPC .......... *B64C 21/08* (2013.01); *B64C 29/0025* (2013.01); *B64D 27/18* (2013.01); *B64C 2039/105* (2013.01); *Y02T 50/166* (2013.01)

(56) References Cited

U.S. PATENT DOCUMENTS

| | | | | |
|---|---|---|---|---|
| 3,065,928 | A | * | 11/1962 | Dornier .................. B64C 23/08 244/10 |
| 3,082,976 | A | * | 3/1963 | Dornier .................. B60V 3/08 114/67 A |
| 3,178,131 | A | * | 4/1965 | Laing .................... B64C 23/02 244/15 |
| 3,291,420 | A | * | 12/1966 | Laing .................... B64C 23/005 244/208 |
| 6,016,992 | A | * | 1/2000 | Kolacny .................. B64C 3/50 244/10 |

* cited by examiner

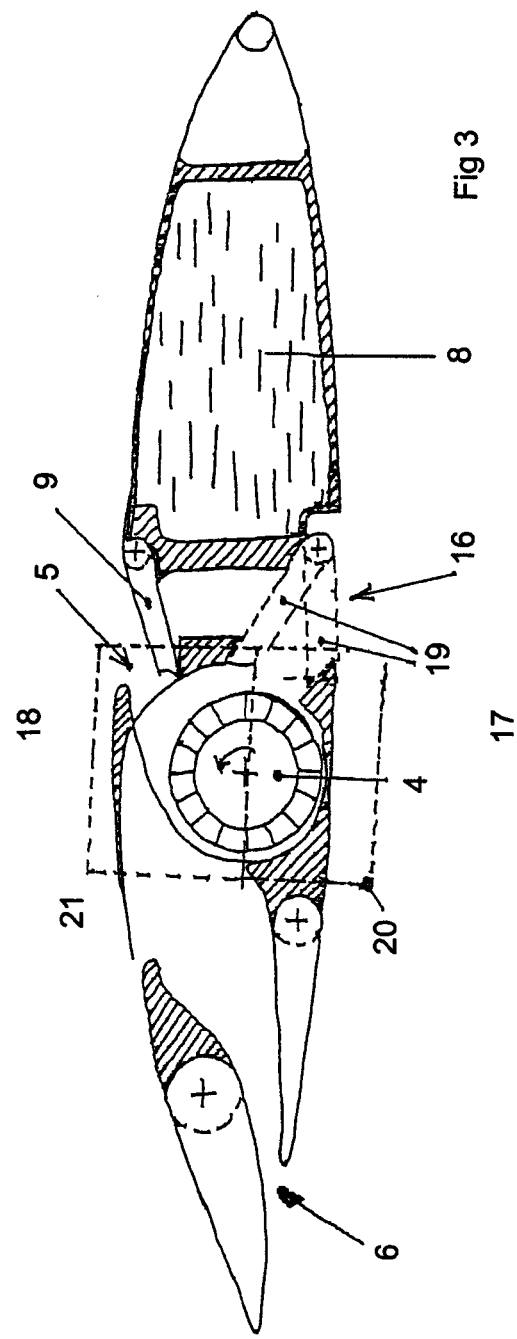

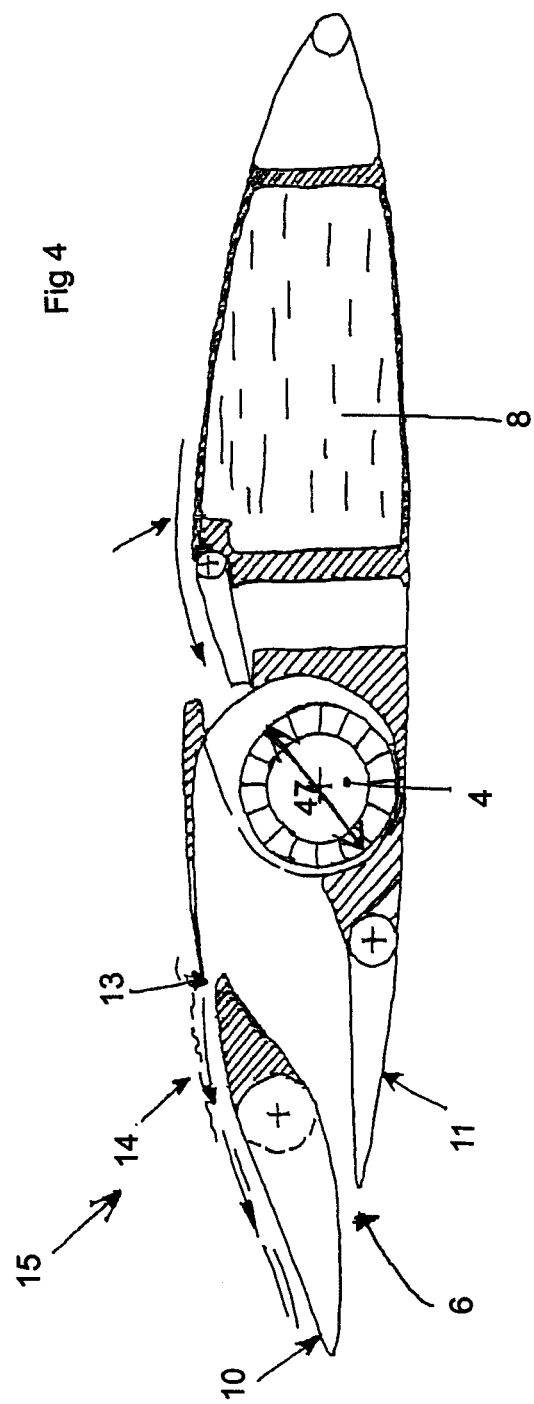

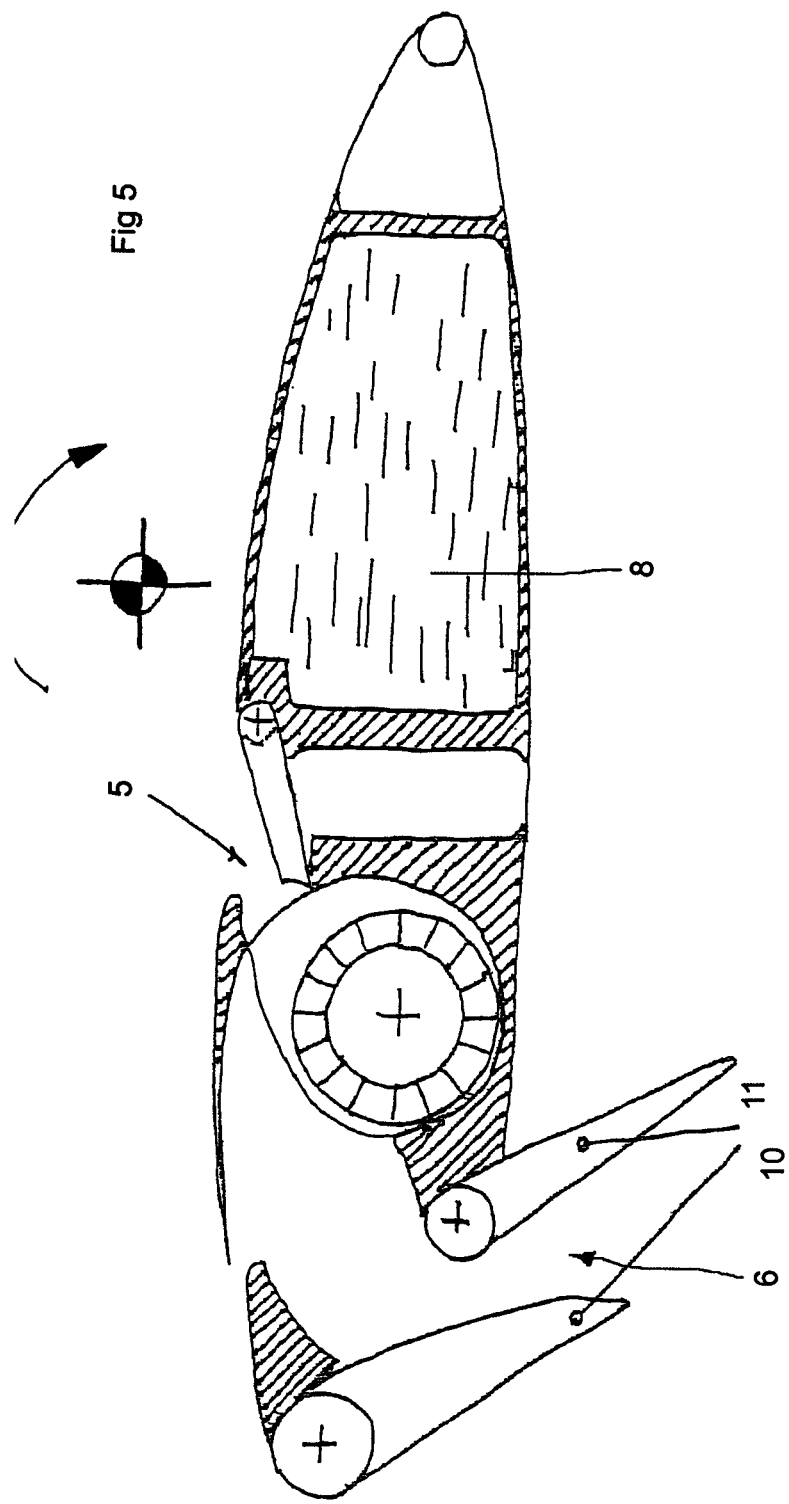

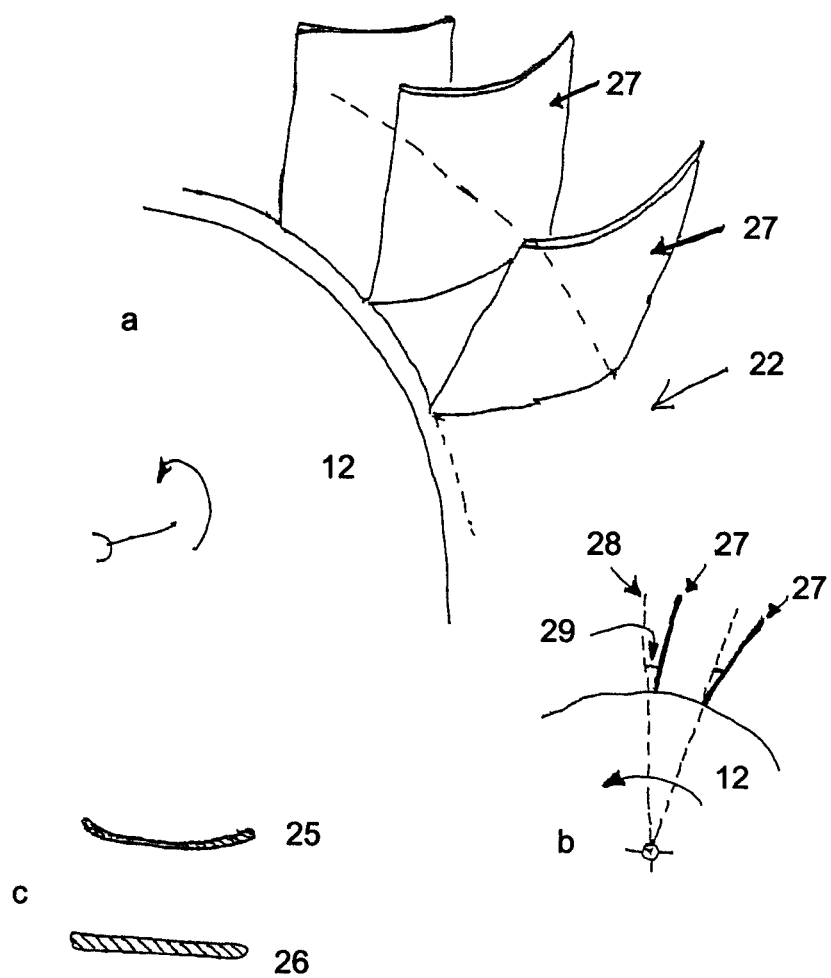

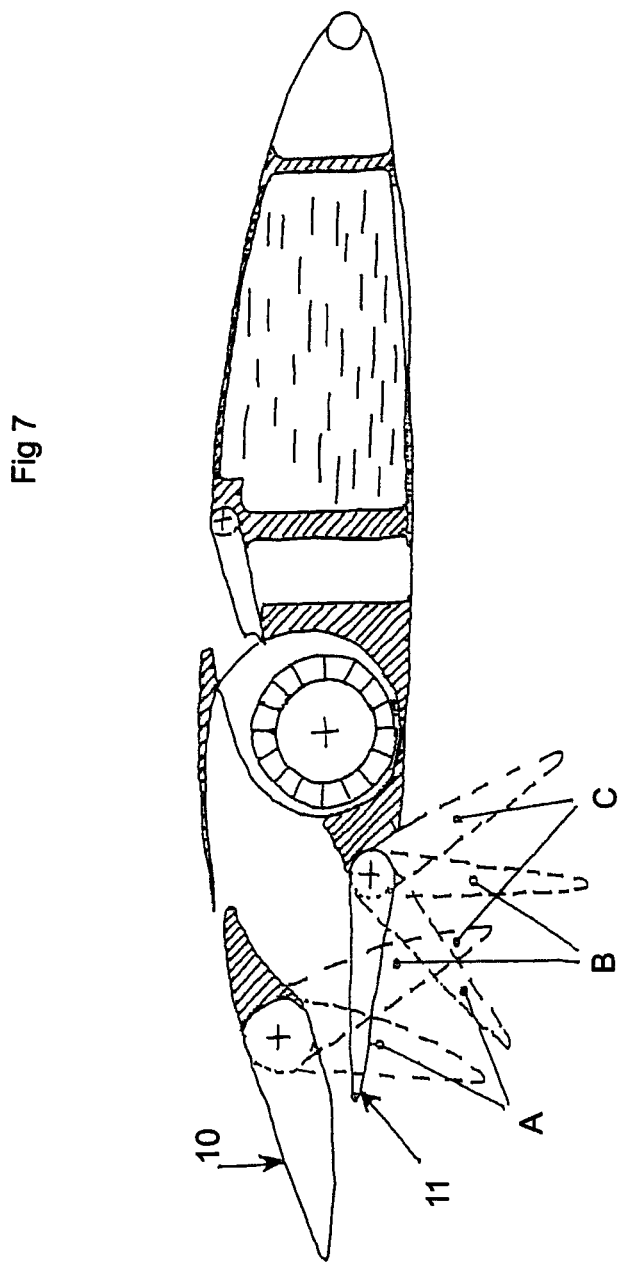

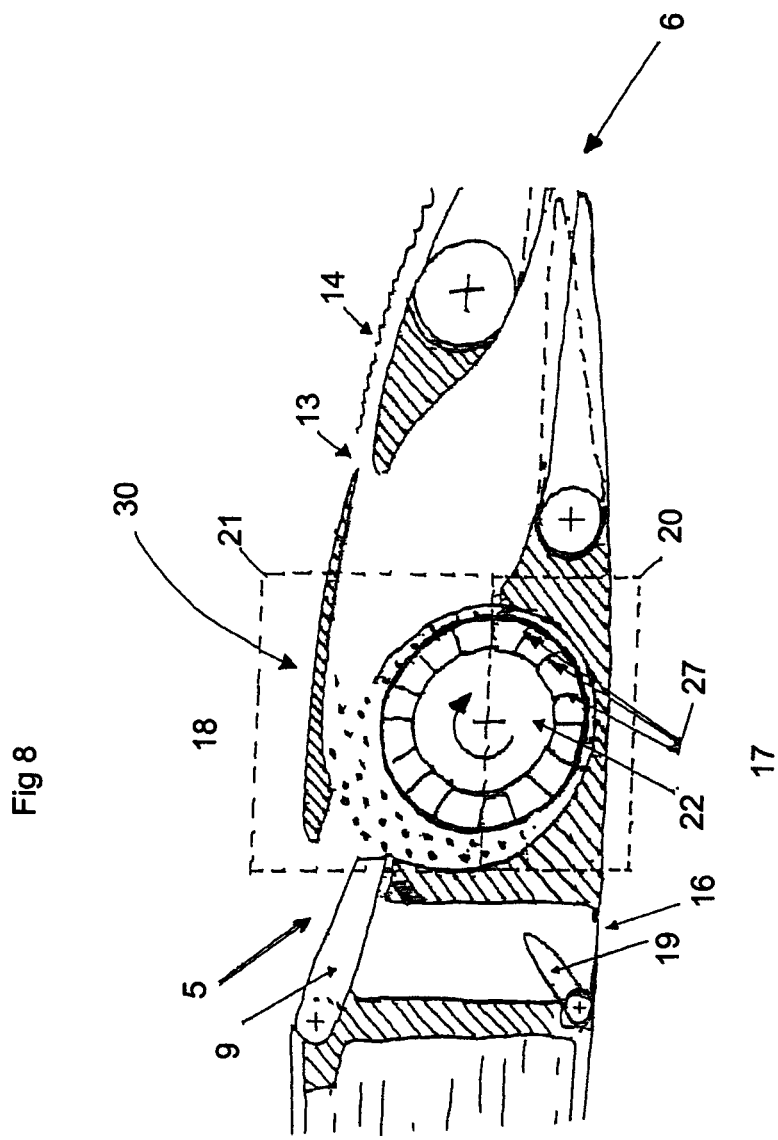

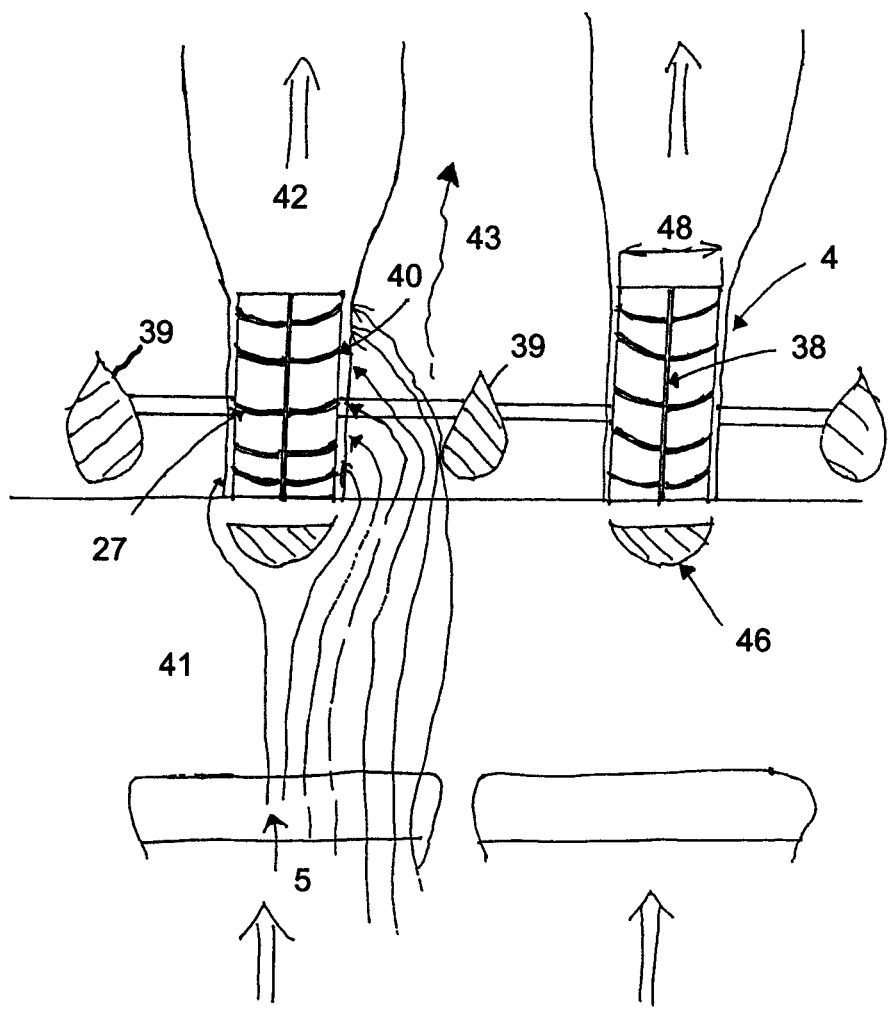

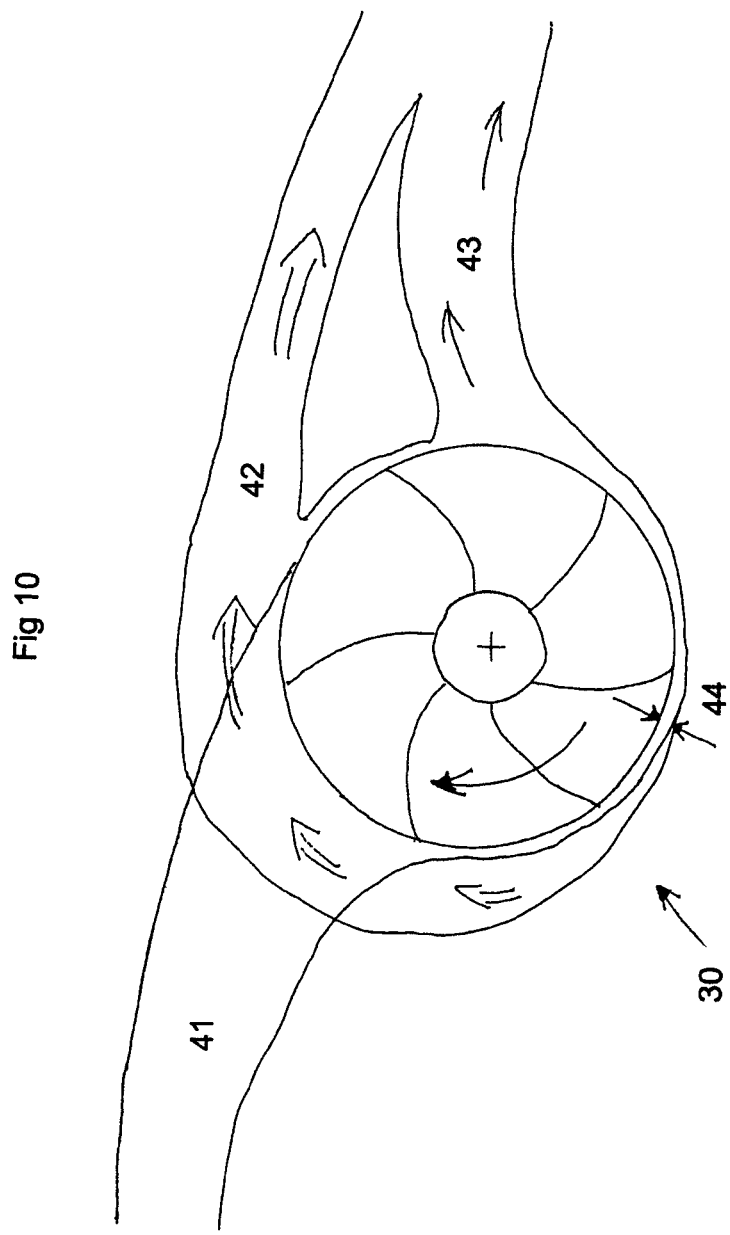

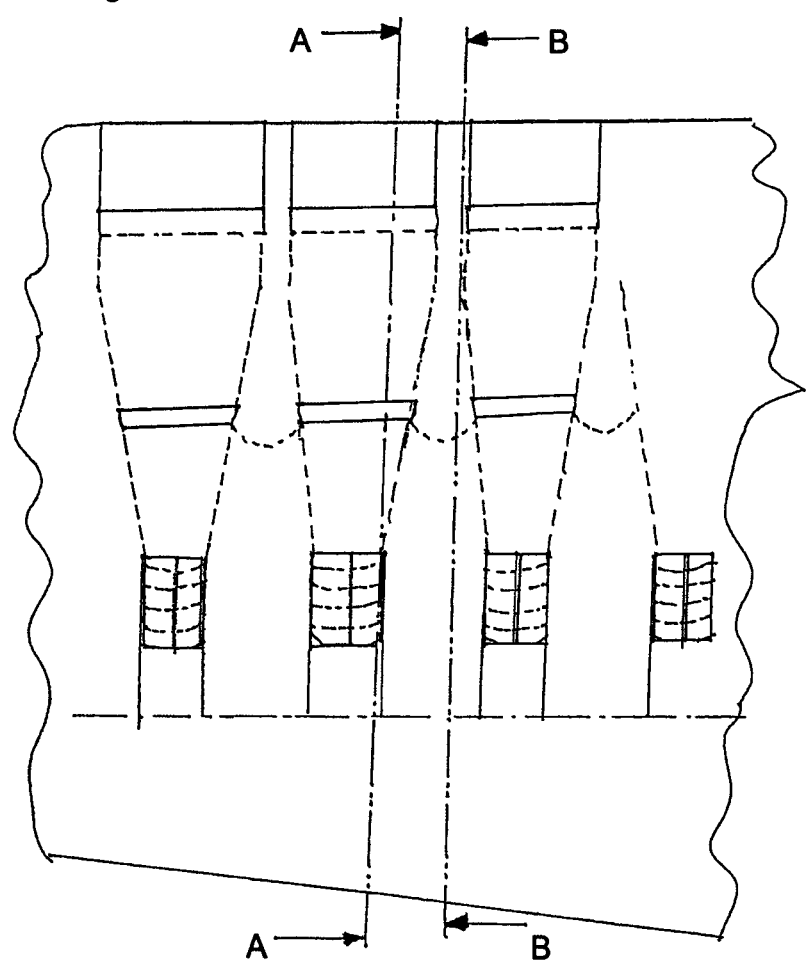

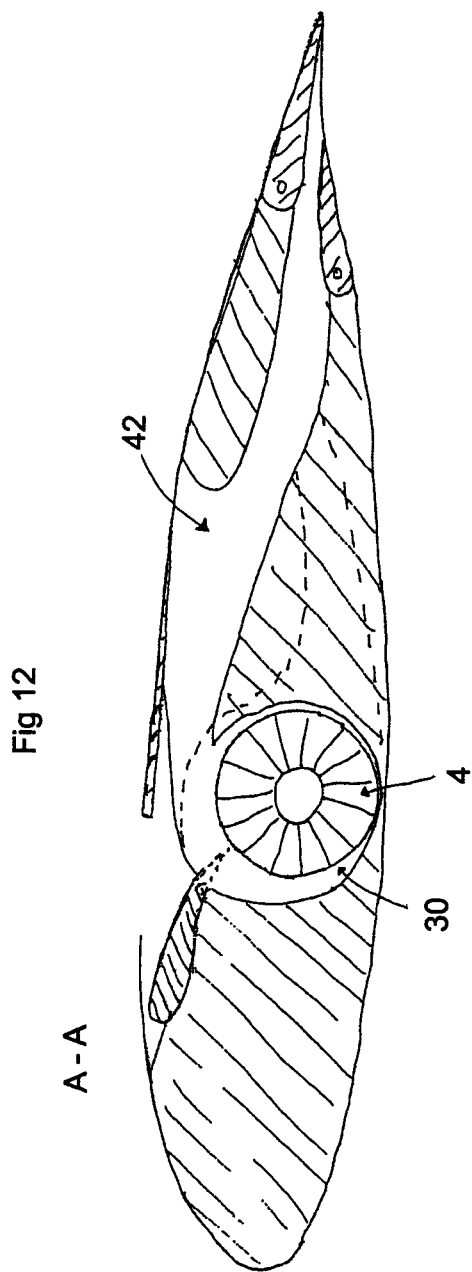

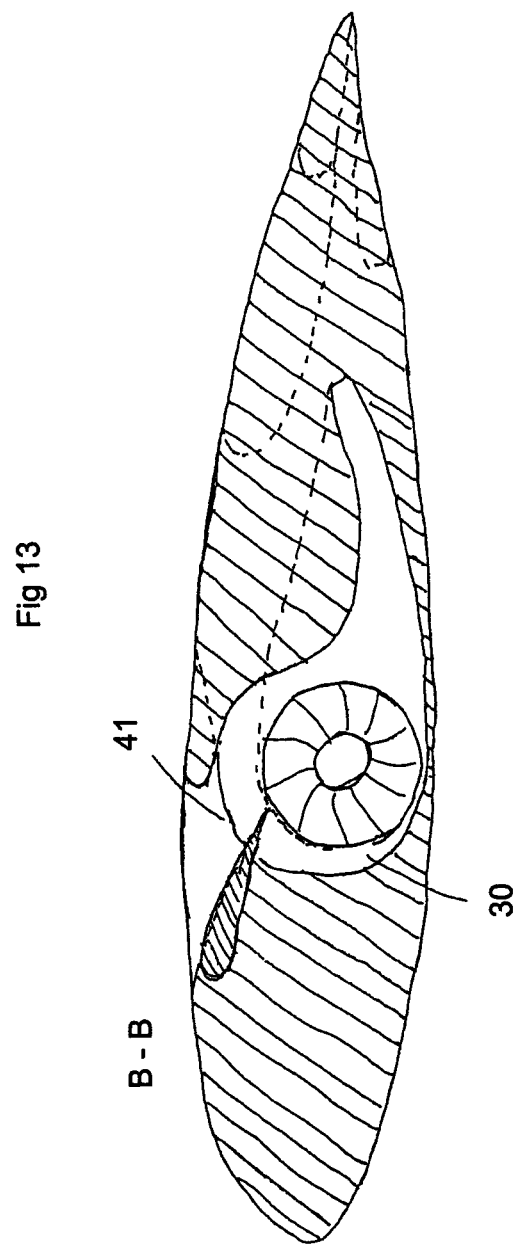

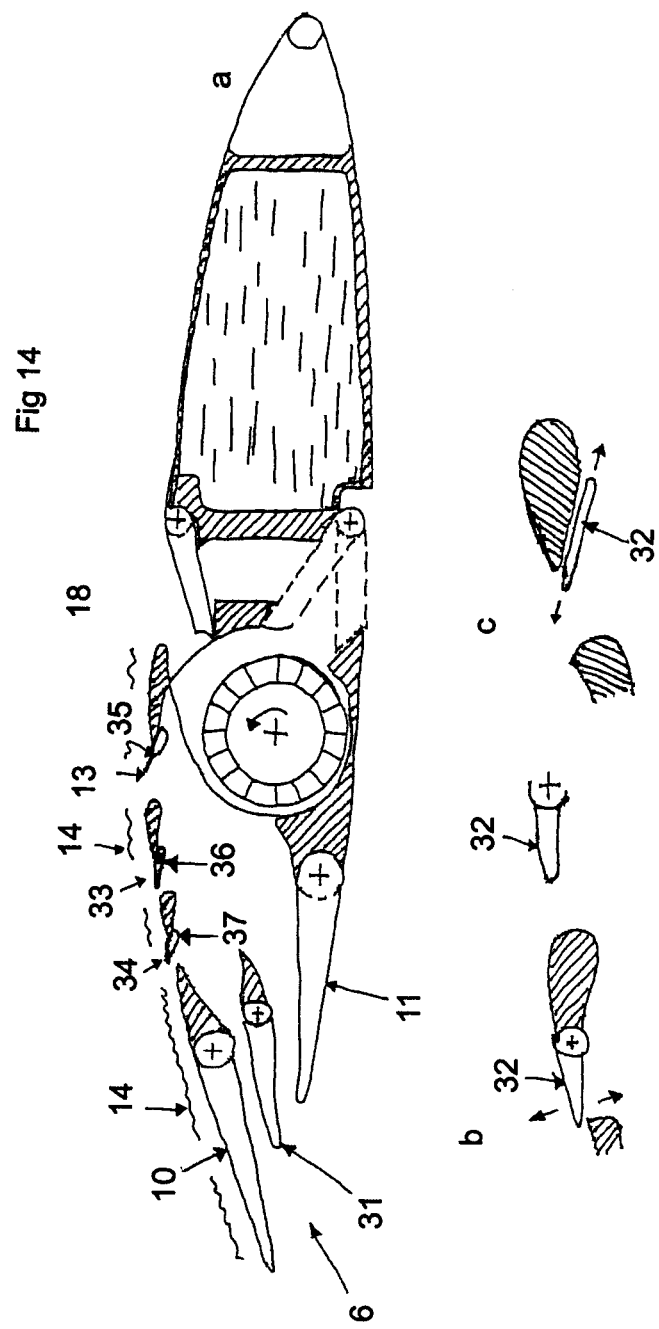

PROPULSION SYSTEM FOR AN AERIAL VEHICLE

BACKGROUND AND PROBLEMS

Developments in civil aviation, as well as military are characterized by improved fuel economy, enhanced safety, lower harmful exhaust emissions and reduced noise. Specifically, in the military aviation sector, is also a move towards improved stealth characteristics, "Stealth—signature adaption".

Proposed invention addresses these areas of improvement and can be applied on flying wings or aircraft of the type "blended wing body", but also on conventional aircraft. The design is then integrated in the wings. The invention enables improved properties such as short take-off and landing distances ("STOL" Short Take-Off and Landing), lower fuel consumption, reduced noise, improved safety and specifically interesting in the military field; greatly improved stealth characteristics, primarily for radar and IR signatures. The invention allows for vectoring the thrust and can in advanced designs allow vertical takeoff and landing ("VTOL" Vertical Take-Off and Landing).

Previously known solutions known from the patents below shows the cross flow type fans. A fan rotor of a cross flow fan has no solid rotor hub that allows the air to pass through the hub, which is made clear, in for example FIG. 1 of U.S. Pat. No. 3,178,131 A. This design is not suitable for high speeds as the structure is too weak. Further, it is very sensitive to damage from foreign objects. A further significant difference between the device in U.S. Pat. No. 3,178,131 and the invention according to the application is that U.S. Pat. No. 3,178,131 discloses a system with elongated fan coils. Also U.S. Pat. Nos. 6,016,992, 3,082,976 and 3,065,928 shows a system with fan designs where fans are formed as elongated rollers, which are also open inside, so-called cross-flow fans. If b is the length of the roll, and D is the diameter of the roll, in which the measure D also includes the fan blades, then b>>D of the previously known solutions and according to the invention of the application b<=D. This difference is important as the invention according to the application requires air to pass through the fan, flow in axially and flow out radially. In the previously known solutions form-wisw almost similar to the invention, the air flows mainly radially into the fan as well as radially out from the fan. The previously known fans have no massive center, but are weak structures.

CLOSER DESCRIPTION OF THE INVENTION

The problems of poor fuel efficiency, high noise and structures sensitive to damage, that today's propulsion concepts have, and that are described in the introduction, is solved by the claimed invention. The invention consists of a hull with an aircraft integrated propulsion system. The propulsion system provides very short take-off and landing distances, high air speed (high subsonic to transsonic) and it can be designed to provide both a very low IR signature and a low radar signature. The aircraft seen from the front, exhibits, by integration of the propulsion system, a small cross-sectional area, and thus has a low air resistance. A vectorization of the air flow created around the aircraft allows for shorter take-off distance and steeper ascent and therefore smaller noise footprint. Vectorisation also means improved flight safety during takeoff and landing, which could then take place using lower airspeeds.

The propulsion system, hereafter called HPVO (High Performance Optimized Versatile propulsion), has unique functional properties and structural characteristics combined with good performance characteristics. The invention is useful both for aircraft of the type for conventional takeoff and landing, "CTOL" (Conventional Take Off and Landing), "STOL" and for vertical take-off and landing, "V(T)OL" (Vertical (Take)-Off and Landing). The invention enables an optimal propulsion system for an aircraft of the type "flying wing" or "blended body", within a very wide possible speed range and with very good stealth characteristics, when it comes to IR and radar signatures, and it generates low noise.

The invention is applicable to both large and small aircraft, manned as well as unmanned aerial vehicles, flying wings, blended body type aerial vehicles and conventional aircraft. "Conventional aircraft" are aeroplanes with a body with wings, like an MD-80 or Boeing 737. The invention comprises one or more engines operating one shaft or several shafts in the basic version. The shaft axis is placed perpendicular the vehicle's longitudinal axis. Arranged in connection with the shaft is at least one differentiated velocity fan (DVF). There are one or more DVFs and they comprise a fan in a fan housing with channels for air passing in and out. The DVFs are mounted to the shaft which rotates. In the drawings it has been chosen to show the shafts transverse to the longitudinal axis of the vehicle, but it could also differ some from this axis. The name DVF is a term that is derived from the fact that incoming air enters the fan at subsonic speed, and from the side of the fan and then is forced out of the fan at high subsonic to transonic speed (approximately 0.8-1.2 M) and approximately perpendicular to the direction from which it came into fan.

At the front edge of the wing at least one air inlet is arranged. The air inlet may also be placed anywhere on the upper side or the underside of the wing. The air intake is designed to provide the smallest possible radar reflection. The technology for this is generally known and therefore not addressed in this application. The air is passed into the DVF or DVFs through the air intakes. The DVF or DVFs accelerate and compresse the air and presses it through one or more exhaustion openings (nozzles) at the trailing edge of the wing's/body's trailning edge, on the upper or the lower side of the wing. Combinations of nozzles in the trailning edge, the upper side and the lower side are possible. At least one of the nozzles can be adjusted by arranging at least one flap at the nozzle and that said flap is maneuverable.

The invention provides an optimized integration of the propulsion system and the hull, which is achieved by the aircraft's airframe parts being designed so that they also constitute the subassembly of the propulsion system. The design gives high lift capacity, low weight, low air resistance, good stability at low speeds as well as at high speeds, high flow control, reduced noise and good stealth properties. High lifting force is obtained through super-circulation around the wing and prevention of flow separation on the wings and flaps by energy supplied in the boundary layer. Air resistance is reduced through the zone with laminar boundary layer extends.

The main component, the fan/fans, in a HPVO consists of a special differential speed fan, DVF (Differential Velocity fan) that may be driven by any type of power system, which system for example can be a gas turbine or other engine. The DVF has a number of fan blades, which during the fan rotation rotates so that air is drawn in through on the wing upper surface located and a flap to its size controlled flush intake, compressed and forced out through an opening nozzle formed in the wing or fuselage rear part.

The versatility of the system include "energizing" of the boundary layer, enhanced control ability at low speed through flap blowing, vectored thrust, large potential change in direction of thrust.

The system is aerodynamically insensitive to variations in the flow angle between the flow of air entering the DVF and the outer edge of the fan blades. This results in very flat fan characteristics which make the system insensitive to variations of fan blade geometry. Additional no conventional vanes (stators) nor variable guide vanes are needed. The aerodynamic design of the rotor is also noncritical as the speed of the incoming air, the relative Mach number, is low. The relative velocity of the inflowing air, the air that enters the fan blades, has subsonic speed. Closest to the hub, the air will hit the fan blades in an axial direction and towards the periphery the air hits the fan blades at an angle different from the axial plane. The blade profile of the rotor is therefore more aerodynamically uncritical than in conventional fan engines and more mechanically resistant to damage by foreign objects, such as ice, hail, birds, sand, volcanic ash, etc. (Foreign Object Damage).

The distance between the fan blades and the fan housing is not critical, as is the case otherwise in an ordinary fan or axial compressor rotor. The design is thus both easy to integrate in a hull or wing and very sturdy. Another great advantage, both in terms of weight and space, is that the propulsion system does not necessarily need any gear between motor and DVF.

The by-pass ratio, BPR, (fan flow ratio) with a DVF driven by one or more gas turbines becomes significantly higher than for a conventional turbofan there are engine of today. For the conventional turbofan there are limitations in BPR as the BPR is increased when the diameter of the fan is increased, resulting in a number of drawbacks. One drawback is that the distance between the engine and the ground decreases, causing the landing gear to have to be redesigned to achieve an increased clearence. An increase in diameter of the nacelle, provides besides the aforementioned disadvantage also an increase in weight and increased drag, both externally and internally. Another disadvantage is that with increasing fan diameter as the difference between the fan rotor and power turbine rotational speeds increase, so that either an additional turbine stagehas to be added or the DVF has to be provided with a gear box, which means both increased costs, need of additional space, increased weight and higher fuel consumption. Another very important aspect is that the radar signature increases with larger engines.

A common BPR ratio for a fan engine (fan engine, turbofan engine) for an advanced fan is today in practice approximately 8 and for a potential open fan theoretically over 20 up to 50, possibly even slightly above 50. In contrast to a conventional fan a DVF system has, for the same BPR, a much smaller rotor diameter and smaller projected area adjoining the in the fan casing rotating fan blades. BPR for the DVF can practically be designed to around 15-30, which enables an effective propulsion efficiency as high as 90 to 95%.

In FIG. 1 the flaps during normal flight is shown and the air flow in and around the wings are shown with arrows.

FIGS. 3-5 and 7-8 show in FIG. 1 section A-A in FIG. 2, but with different details numbered. In FIG. 8 a section A-A is also shown, but of a wing of the an alternative embodiment.

Figure 1:
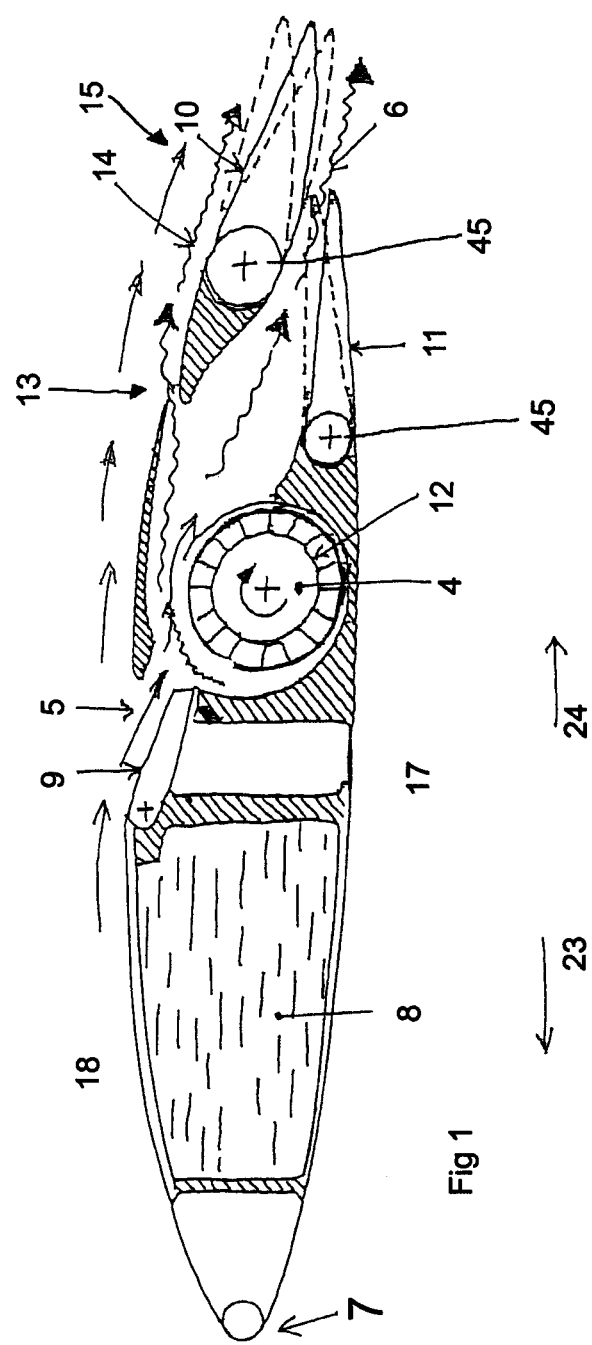
FIG. 1 shows a section of a wing according to a section A-A, whose position in an aircraft is shown in FIG. 2.

FIG. 6 shows the detailed shape of the rotor blade at the base and at the tip. With external is referred to the portion which is radially furthest from the DVF's center of rotation. The blades are leaning back from the direction of rotation and cupped forward.

FIG. 7 shows how an upper nozzle flap (10) and the nozzle flap/spoiler (11) interacts in three different positions FIG. 9 shows how the air flows inside the propulsion system viewed from above.

FIG. 10 shows how the air flows which are shown from above in FIG. 9 looks when viewed from the side.

FIG. 11 shows the propulsion system seen from above and, with four DVF's outlined. In the figure is also the section shown in FIGS. 12 and 13 marked.

FIGS. 12 and 13 show two different sections through a wing, with the propulsion system. In FIGS. 12 and 13, the air flows as shown from above in FIG. 9 are marked.

FIG. 14 shows an alternative embodiment with several air inlet openings and valves.

The number in parenthesis indicates at least one figure in which the reference number is found.

1. Aerial vehicle (2)
2. Power unit (2)
3. Power transmission device (2)
4. DVF, differentiated velocity fan (1-6, 9)
5. Air intake (1)
6. Jet nozzle (1, 3, 4-5, 8)
7. Leading edge (1,2)
8. Fuel Tank (1, 3-5)
9. Air intake flap (1, 3, 8)
10. Upper nozzle flap (1, 5, 7)
11. Nozzle flap/Spoiler (1, 5, 7)
12. Rotor hub (1, 6)
13. Opening (1, 9)
14. Energized airflow (1, 4, 8)
15. Rear upper part of wing (4)
16. Secondary air intake (3)
17. Lower surface (1, 3, 8)
18. Upper surface (1, 3, 8)
19. Flap (3)
20. Lower fan housing (3, 8)
21. Upper fan housing (3, 8)
22. Rotor (6,8)
23. Forward direction (1)
24. Rearward direction (1)
25. Curved profilel (6)
26. Straight profile (6)
27. Fan blade (6)
28. Perpendicular to the rotor surface (6)
29. Angle (6)
30. Fan housing (8)
31. Flap (9)
32. Flap (9)
33. Opening (9)
34. Opening (9)
35. Flap (9)
36. Flap (9)
37. Flap (9)
38. Separating wall/disc between left and right side of the fan rotor (9)
39. Struts (9)
40. Open part of fan rotor (9)
41. Forward air duct (9)
42. Rear air duct (9)
43. Spill over (9)
44. Slot (10)
45. Shaft (1)
46. Plug (9)
47. Diameter (4)
48. Width (9)

Figure 2:
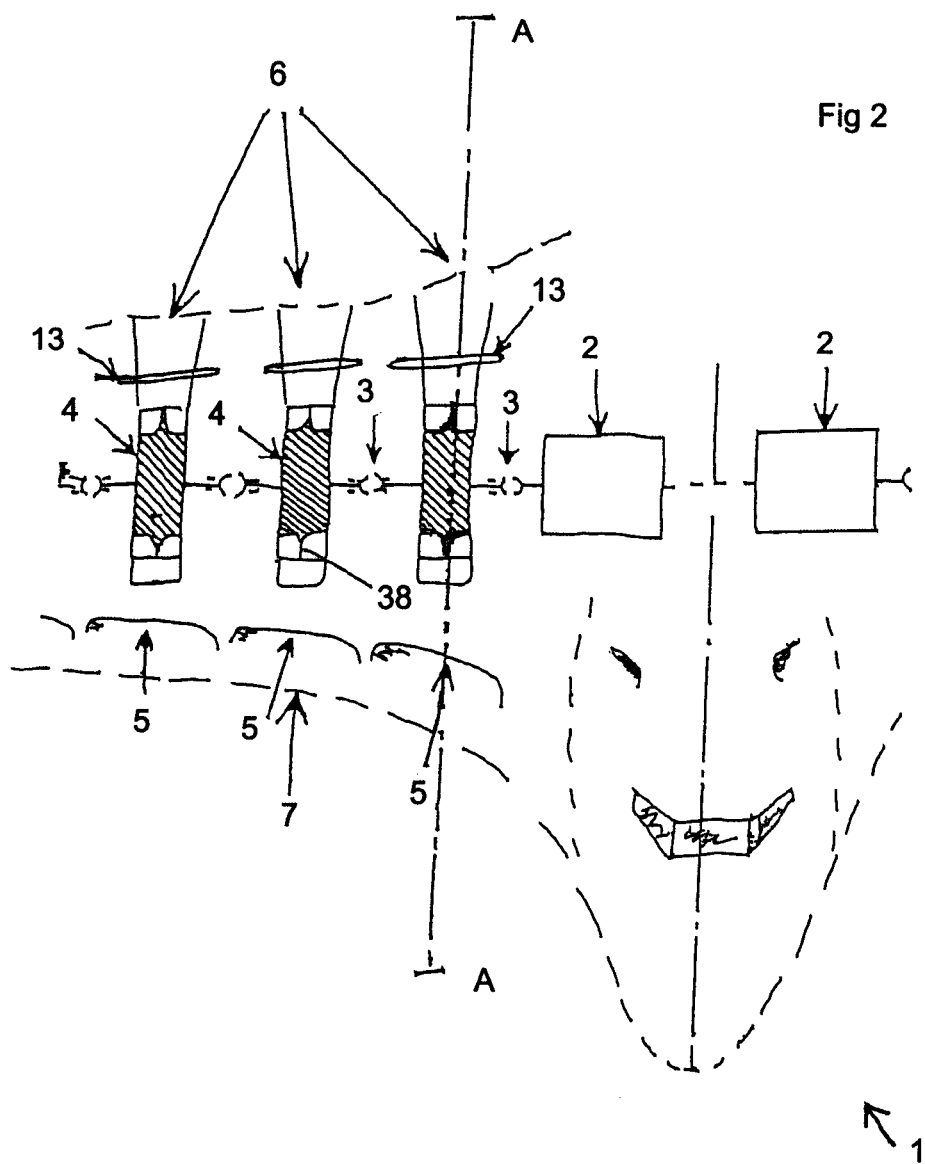

FIG. 2 shows diagrammatically a part of an air vehicle (1) with a propulsion system according to the invention. The system includes one or more centrally placed power units (2), from which power can be transmitted with a power transmission device (3), to the DVF or the DVFs (4). The power transmission devices (3) may, but need not, be equipped with gearing to regulate the speed of the DVFs (4) independent of the rounds per minut of the, of the power units (2), which also may be equipped with the ability to regulate the speed.

FIG. 2 shows an air intake (5), which is also included in FIGS. 1-5 and 8-9. The air intake (5) is advantageously, from a stealth perspective, designed as a flush intake, which can both be covered with a net with a radar absorbing surface material, and which further can be designed with no sharp corners or edges, which gives radar reflections. With a flush intake is meant an air intake which is an opening in a smooth surface and which has no edges around the air intake so that it provides minimal radar reflections. Designing air intakes as flush intakes is also made in order to reduce drag. How air intakes could be designed to give as small radar reflections as possible is previously known and is therefore not included in this application. FIG. 2 shows how the air flows inside the air vehicle (1), from the air intake (5) further toward the DVF, into which the air enters in an axial direction and then is by the DVF pressed out substantially radially in substantially one direction, against a jet nozzle (6) and an opening (13). In FIG. 1 is also seen a fuel tank (8).

FIG. 1 shows the section A-A in an aircraft wing. The section A-A is also highlighted in the second figure The FIG. 1 shows the aircraft's wing leading edge (7), which shape is determined by in which speed range the aerial vehicle (1) is intended to fly. At the air intake (5) is an air intake flap (9) provided that controls the air intake's (5) geometry.

FIG. 1-5 illustrates jet nozzles (6) which are designed as openings along the wing. The exhaust gases from the power units (2) are led off to the jet nozzles (6), to mix with cool air that has passed through the DVF (4), in order to avoid strong singular IR sources on the wing's trailing edge. When a power unit (2) is used which does not produce exhaust gas, for example an electric motor this is not needed. The jet nozzle's (6) shape and direction will vary with how a nozzle flap/spoiler (11) and an upper nozzle flap (10), who are shown in FIGS. 1, 3-5 and 7, is directed. In FIGS. 1 and 2 is an embodiment shown with jet nozzles (6) from the power units (2) located on an upper surface (18) of the air vehicle (1). If they are arranged on the upper surface (18), good stealth characteristics are obtained as seen from a lower surface (17). Similarly good stealth properties viewed from above can be obtained if the jet nozzles (6) placed on the lower surface (17). For a high-flying aircraft would thus jet nozzles (6) on the upper surface (18) may be preferable.

The air intake flap (9) is at normal flying about in the position shown in FIG. 1. The opening occurring at the air intake flap (9) in this position allows air into the DVF (4). In FIG. 1 is also shown an upper nozzle flap (10) and a nozzle flap/spoiler (11) which in the figure are set for normal flight. They are maneuverable arranged around a shaft (45) which enters plane of the figure and marked with a "+" by all controllable flaps. In the figure is also shown with straight arrows how the incoming "unprocessed" air flows and with thin shaky arrows how the by the DVF "energized" airflow (14) flows.

In FIGS. 1 and 4 is shown how a small portion of the air is forced by the DVF (4) to flow out through an opening (13). The air stream consists of energized air (14) which flows over a rear portion of the rear upper part of the wing (15) and the upper nozzle flap (10). Because the energized airflow (14) has been energized by the DVF (4) a stronger rudder response is achieved than by conventional wing designs. Even the lift force increases significantly compared with other known designs. This construction with an opening (13) which provides a flow of energized air (14) along the rear upper part of the wing (15) and over the upper nozzle flap (10) gives the increased lift and rudder response provides the ability to takeoff and landing as well as flying at very low speeds. The air resistance will be low by as the boundary layer, as the energized airflow (14) represents, gives a laminar flow over a longer distance than conventional wing designs.

FIG. 7 shows how upper the upper nozzle flap (10) and the nozzle flap/spoiler (11) interact in three different positions, in the figure marked A, B and C. In position A the flaps brakes. Separate spoilers for braking are not required for an aircraft with this type of propulsion. In position B a very strong brake force is achieved and in position C and a further more powerful braking is achieved. With a structure designed for it the aircraft can back in position C. In the position C, as shown in FIG. 5, the aircraft could alternatively be given a "nose down" movement, which movement is illustrated by the arrow in FIG. 4.

FIG. 3 shows an alternative design of the air vehicle (1) which can be particularly useful when a low-flying aircraft with good stealth properties seen from above is required or where additional air is required to allow the DVF to issue more propulsion power. Being able to get more power out of the DVF (4) is an option that can be used continuously during flight or it can be used when starting to quickly get into the air. In the embodiment, a secondary air intake (16) has been arranged on the air vehicle (1) lower surface (17). This secondary air intake (16) is closable by a flap (19) in the same manner as the air intake (5) is closable with an air intake flap (9). The secondary air intake (16) can be used to supplement the air intake (5) or instead of same. When the air intake (5) is closed with the air intake flap (9) the upper surface of the wing becomes a smooth surface which gives a minimum of radar echoes seen from the upper surface (18). Likewise, if the secondary air intake (16) is closed that gives the lower surface (17) a smooth shape. The design shown in FIG. 3 provides the ability to fly with any air intake closed in order to adapt the stealth characteristics to the situation. The amount of air used by the DVF (4) can also be regulated.

In the basic design is the air vehicle (1) is equipped with one or more centrally placed power units (2). Which type of power units (2) that are chosen, and how the air intake (5), secondary air intake (16), the jet nozzle (6) and the opening (13) are arranged and designed are dependent on the air vehicles operative use and it's speed. The air vehicle can be a small unmanned vehicle driven by a small electric motor and a battery. It can also be big enough for a crew, and it can be equipped with turbofan or turboprop engines or with other suitable types that can handle the load and range. To provide stability, thrust and lifting power and fuel efficiency a number of DVFs should preferably be used. For the best power efficiency they should be mainly in line with each other and the power units (2). Between the centrally located power units (2) and the DVFs a power transmission device (3) is arranged, for example in the form of a shaft. On the shaft knots and gearbox may be arranged. All such equipment, however, consumes some of the total power.

An alternative embodiment, which may be suitable for larger air vehicles, is to arrange the power units (2) closest to the DVFs (4) to obtain a robust design that can handle the failure of one or more power units (2), as there are still other power units functioning. In this embodiment each power unit (2) supplies one or at most two DVFs (4).

FIG. 8 shows how a DVF (4) consists partly of a rotor (22) with fan blades (27) and partly by a fan housing (30), which fan housing consists of the entire cavity around the DVF (4) this is marked as dotted in the figure. The DVF (4) is arranged in the fan housing (30), whose shape is such that it is eccentrically oriented in relation to the axis of rotation, the axis of rotation is positioned such that the air gap between the fan blades and the lower fan housing (20) is smaller than the air gap at the upper fan housing (21).

The rotational axis is marked with + in FIG. 8. The DVF (4) and the fan housing (30) interact with each other so that the air that is sucked in through the air intake (5) or secondary air intake (16), by the rotation of the DVF, and energized by the DVF (4) by passing the fan housing (30). Thereafter, some of the air flows out through the opening (13) and through the jet nozzle (6). The air that has been energized by the DVF (4) and that has passed through the opening (13) will provide a boundary layer in the form of an energized airflow (14) on top of the wing and thus provides lift to the aerial vehicle (1). The remaining energized airflow (14) will pass through the jet nozzle (6), which, as previously described in the application, is adjustable with the flaps (10, 11) so that traction and control in pitch and rolled on the aerial vehicle can be controlled.

FIG. 14 shows an alternative embodiment. FIG. 14a shows a how a plurality of openings, opening (13), opening (33) and opening (34), in the figure is as an example three pieces shown, arranged to obtain a longer distance along the wing's upper surface (18) with energized airflow (14). The longer the distance with energized airflow is, the lower the air resistance is and the higher the lift force is. The openings (13, 33, 34) can also be fitted with flaps (35, 36, 37), for regulation of airflow and to provide stealth characteristics seen from the upper surface (18). The flaps (35, 36, 37) may be of any suitable type, in FIG. 14c, a flap (32) is shown that is of the type sliding flap and in FIG. 11 a flap (32) that is folds is shown. Another embodiment is to arrange at least one further flap (31) at the jet nozzle (6) with which flap (31) the fan's operating point may be regulated and different functionalities, such as variation of the tensile force vector's direction, can be obtained by regulation of the exhaustion area.

FIG. 6 shows details in the DVF (4). FIG. 6a shows a piece of the DVF (4), in the center is a rotor hub (12) at which the fan blades (27) are attached. The rotor hub is solid. FIG. 6b shows how the fan blades (27) extends substantially radially out from the rotor hub (12) and parallel to its surface normal (28), but with an angle (29) relative to the normal (28) so that they are tilted backwards, from the fan rotation direction, the rotation direction is marked in FIGS. 6a and 6b. In FIG. 6C it is shown that the the fan blades (27) at the part closest to the rotor hub (12) has a substantially straight profile (26) and that they at their outer edges has a curved profile (25), this is also apparent in FIG. 6a.

FIG. 9 shows a cross section in the horizontal plane of the propulsion system. The air enters through the air intake (5), passing via a forward air duct (41) into and radially towards the DVF (4). In front of the DVF (4) is a plug (46) is provided which acts as stream divider and that reduces losses which would otherwise arise due to pressure drop. The side of the DVF (4) between the rotor hub (12) and outwards to the outer periphery of the blade is open so that the air has free passage into an open part of the fan rotor (40) between the fan blades (27). Between the DVF's (4) right and left sides, there is a separating wall/disc between left and right side of the fan (38), which prevents air from passing between the DVF's (4) right and left sides and ensures that the air is pushed out radially from the DVF (4). Air that doesn't go into the DVF (4), excess air, "Spillover" (43), flows further back and passes out through both the opening (13) and through the jet nozzle (6) along with the air that has passed through the DVF (4). In FIG. 10 is shown how the air that passes through the DVF (4) is pushed backwards through a rear air duct (42) by the DVF (4), which becomes broader backward but also lower, so that the cross-section of the rear air duct (42) gradually decreases causing the air velocity gradually increases. The DVFs (4) are fitted with a number of struts (39) which support the DVF s (4) and fixes them in the air vehicle (1). In the FIGS. 12 and 13 is shown that most of the air entering the fan housing (30) through the forward air duct (41) is forced axially into the DVFs (4) and then pressed radially out through the rear air duct (42).

FIG. 10 shows how the forward air channel (41) and the rear end channel (42) are formed. The DVF (4) is eccentrically mounted in the fan housing (30) between the DVF (4) and the fan housing (30) there is a slot (44). The slot's (44) height is uncritical and in the order of 1% of the DVF's (4) diameter.

FIG. 11 shows a view from above of a part of the system in the air vehicle (1). In the figure, the two sections, A-A and B-B are marked. These sections are shown in FIGS. 12 and 13, Forward air duct (41) and rear air duct (42) have a lateral offset, so that air forced into the DVF (4) axially and out radially.

The air describes a helical movement with decreasing radius in the vertical plane and the air pressed out describes a helical movement with increasing radius in the vertical plane. Each DVF (4) has two forward air ducts (41), one on each side of the DVF (4) and a rear air duct (42) that is located between the two forward air ducts (41).

Description of a Theoretical Model for the Performance and Efficiency for the Differential Speed Fan Analysis of the performance and efficiency of a propulsion system according to the invention. The thermodynamic model for a HPVO must be derived from the fundamental equations for a turbojet engine, because of the specific characteristics of compressor types that are covered in the literature, (axial, radial, diagonal flows, etc.), cannot be applied to the most important components, mainly DVF, in HPVO.

$$BPR = \dot{m}_2/\dot{m}_1$$

where $\dot{m}_1$=air flow through the gas generator, "airflow gas generator", power turbine air, that is, the air that goes in to the power unit (2). For an electric motor is $\dot{m}_1$ O $\dot{m}_2$=airflow through the fan, "airflow fan"

And the enthalpy reduction in the power turbine:

$$\Delta H = u_{ej}^2/2$$

Where $u_{ej}$=jet velocity, "jet velocity" in the gas generator, fictive jet velocity by the power unit And $u_{ef}$=jet velocity, "jet velocity fan" the jet velocity from the DVF T=thrust "Thrust"

$u_a$=flying speed $$T = \dot{m}_2(u_{ef} - u_a) + \dot{m}_1(u_{ej} - u_a)$$

Where $\dot{m}_1(u_{ej} - u_a) \ll \dot{m}_2(u_{ef} - u_a) \rightarrow T \approx \dot{m}_2(u_{ef} - u_a)$ $u_e$=jet velocity outflow $u_a$=flying speed $$P = \dot{m}\left(\frac{u_e^2}{2} - \frac{u_a^2}{2}\right);$$

P=the effect transferred to the gas (the air) input power to the gas (air)

$$\dot{m}_1\left(\frac{u_{ej}^2}{2} - \frac{u_a^2}{2}\right) = \dot{m}_2\left(\frac{u_e^2}{2} - \frac{u_a^2}{2}\right)$$

$$BPR = \frac{\dot{m}_2}{\dot{m}_1} = \frac{\left(\frac{u_{ej}^2}{2} - \frac{u_a^2}{2}\right)}{\left(\frac{u_{ef}^2}{2} - \frac{u_a^2}{2}\right)}$$

$$T = \dot{m}(u_e - u_a)$$

$$\eta_p = \frac{2}{1 + \frac{u_e}{u_a}} \rightarrow \eta_p = 100\% \ då$$

$u_e = u_a$, but this implies when T=0, which means that $u_e$ have to be larger than $u_a$ in reality An alternative way to calculate optimal BPR is by calculating with the kinetic, "energy approach", "power".
Ideal is:

$$\dot{m}_1\left(\frac{u_{ej}^2}{2} - \frac{u_a^2}{2}\right) = \dot{m}_2\left(\frac{u_{ef}^2}{2} - \frac{u_a^2}{2}\right)$$

$$\rightarrow \frac{\dot{m}_2}{\dot{m}_2} = \frac{\left(\frac{u_{ej}^2}{2} - \frac{u_a^2}{2}\right)}{\left(\frac{u_{ef}^2}{2} - \frac{u_a^2}{2}\right)} = \frac{(u_{ej}^2 - u_a^2)}{(u_{ef}^2 - u_a^2)}$$

$$\rightarrow BPR = \frac{(u_{ej} + u_a)(u_{ej} - u_a)}{(u_{ef} + u_a)(u_{ef} - u_a)} = \frac{\left(\frac{u_{ej}}{u_a} + 1\right)\left(\frac{u_{ej}}{u_a} - 1\right)}{\left(\frac{u_{ef}}{u_a} + 1\right)\left(\frac{u_{ef}}{u_a} - 1\right)}$$

Derivation of Thrust and Effect for the DVF
$c_r$=radiel velocity
c=absolute velocity
"1"=inner diameter, hub
"2"=outer diameter, tip
$r_2$=tip radius
$r_1$=hub radius $$\omega = \frac{2\pi n}{60}$$

n=rpm; u=ωr
$c_u$=tangential velocity=σu, and
$c_{u2}$=σu$_2$
where σ=slipfactor
$u_a$32 flow velocity in "inlet velocity"(=flying speed during flight)

$c_{ax}$=rotor axial inflow velocity
$c_{ui}$=absolute inflow velocitya
$c_{u2}$, $u_2$, $c_{uin}$, ω, $\omega_2^1 \cdot c_2 \approx u_e$
$c_{ax}$, $c_r$, r, $r_0$, $r_i$, ω, s
$r_i$=inner radius for the completely compact hub in the DVF
$r_o$=radius, as long as the blades reaches out towards the DVF
$R_o$=Maximal radius for the fan house in which the DVF is housed (spiral shape)
b'=the distance over half the fan blade
a=half the distance between the fan and fan No. n No. n+1

$$s = 2a + 2b'$$

$$a \approx b' \rightarrow s \approx 4a$$

$$b = \sum_{n=1}^{n} b'$$

$$u = \frac{r'}{r_0} u_0$$

$$2\pi r_0 (1 - v^2) c_{ax} = c_u (R_0 - r_0) s$$

$$v = \frac{r_i}{r_0}$$

At i)$u_i \approx C_{u_i}$ $$u_i = u_0 \left(\frac{r_i}{r_0}\right)$$

$$c_{u_i} = c_{u_o} \left(\frac{r_0}{r_i}\right) \ (potentialfowt)$$

T=Thrust, (N)
P=Power, effect(Nm/s)

$$\frac{T}{P} = \frac{2}{u_{ef} + u_a} = \frac{2}{\frac{u_{ef}}{u_a} + 1}$$

With a differentiated velocity fan $u_e \approx u_a$ which implies that the propulsion efficiency goes towards 1.

The invention claimed is:

1. A propulsion system for an air vehicle (1) that comprises at least one differential velocity fan (4), housed in and concentrically arranged in a fan housing (30), wherein the differential velocity fan comprises a rotor hub (12), by which said rotor hub fan blades are attached and stretch substantially radially out from the rotor hub, at least one power unit (2) and at least one power transmission device (3) for transferring power from the power unit to the differential velocity fan, and that said propulsion system is characterized in that said propulsion system comprises said at least one velocity fan or fans that are arranged with their rotational axis perpendicular to a longitudinal axis of the air vehicle and that the velocity van has a length, b, and a diameter, D, and that b<=D, wherein said propulsion system comprises at least one forward air duct (41) and at least one rearward air duct (42) where air is led from air intakes (5; 16) rearwards in the air vehicle through the forward air duct, the forward air duct widening in cross section causing the speed of the air to decrease and static pressure to increase, thereafter the air is led axially into the differential velocity fan which rotates and pushes the air out radially from the fan into the rearward air duct, the rearward air duct successively decreasing in its cross section causing the speed of the air to successively increase in the rearward air duct and thereby decreasing static pressure, further a portion of the air is forced out through an opening (13) on an upper side of the air vehicle giving an energized airflow (14) on the upper side of the air vehicle, while the bulk part of the air passes through jet nozzles (6), each nozzle is regulated by a nozzle flap/spoiler (11) and an upper nozzle flap (10) said nozzles generate drag by the passage of air from the differential velocity fan to and through the nozzles.

2. The propulsion system for an air vehicle according to claim 1 characterized in that the at least one forward air duct is situated between rearward ducts to cause the air to pass from the forward air duct axially into the differential velocity fan and further out radially from the forward air duct, the forward air duct is so shaped that the air in the forward air duct describes a spirally shaped motion with decreasing radius in the vertical plane and the air that is pressed out through the rearward air ducts describes a spirally shaped motion with increasing radius in the vertical plane.

3. The propulsion system for an air vehicle according to claim 1 characterized in that the fan blades (27) are attached to the rotor hub (12) with an angle (29) relative to the normal (28) of the rotor hub making them lean backwards from the differential velocity fan's (4) rotation direction, wherein the innermost part of the fan blades (27) closest to the rotor hub have a substantially straight profile, their outer edge, furthest away from the rotor hub, have a substantially curved profile (25) that makes them arched forward.

4. The propulsion system for an air vehicle according to claim 1 characterized in that the differential velocity fan (4) has a separating wall/disc between a left and right side of a fan rotor (38) that separates the left and right side so that air cannot flow across the differential velocity fan.

5. The propulsion system for an air vehicle according to claim 1 characterized in that the differential velocity fan's width (48) is less than or equal to the differential velocity fan's diameter (47).

6. The propulsion system for an air vehicle according to claim 1 characterized in that the fan blades have an aerodynamic design with a subsonic air profile, said profile providing a robust and aerodynamically uncritical construction.

* * * * *